United States Patent
Yoshikawa

(10) Patent No.: US 8,217,708 B2
(45) Date of Patent: Jul. 10, 2012

(54) TEMPERATURE SENSOR

(75) Inventor: Kiyoshi Yoshikawa, Chiba (JP)

(73) Assignee: Seiko Instruments Inc. (JP)

( * ) Notice: Subject to any disclaimer, the term of this patent is extended or adjusted under 35 U.S.C. 154(b) by 207 days.

(21) Appl. No.: 12/615,597

(22) Filed: Nov. 10, 2009

(65) Prior Publication Data

US 2010/0123510 A1    May 20, 2010

(30) Foreign Application Priority Data

Nov. 14, 2008   (JP) ................................ 2008-292512

(51) Int. Cl.
*H03K 3/011* (2006.01)
*G01K 7/34* (2006.01)
*G01K 7/01* (2006.01)

(52) U.S. Cl. ........ 327/513; 327/172; 374/170; 374/173; 323/316

(58) Field of Classification Search .................. None
See application file for complete search history.

(56) References Cited

U.S. PATENT DOCUMENTS

| | | | | |
|---|---|---|---|---|
| 6,356,161 | B1 * | 3/2002 | Nolan et al. ................. | 331/176 |
| 7,345,460 | B2 * | 3/2008 | Ma et al. ...................... | 323/283 |
| 7,726,877 | B1 * | 6/2010 | Avitan ........................ | 374/170 |
| 2010/0103979 | A1 * | 4/2010 | Anzai ........................... | 374/173 |

FOREIGN PATENT DOCUMENTS

| | | | |
|---|---|---|---|
| JP | 2006-101489 A | | 4/2006 |
| JP | 2010-117319 | * | 5/2010 |

* cited by examiner

*Primary Examiner* — Lincoln Donovan
*Assistant Examiner* — Terry L Englund
(74) *Attorney, Agent, or Firm* — Brinks Hofer Gilson & Lione

(57) ABSTRACT

A temperature sensor performs more precise temperature measurement, even when manufacturing fluctuations are present in semiconductor elements forming a circuit for generating a temperature-dependent current. The temperature sensor includes: a temperature-dependent voltage generation circuit for generating a temperature-dependent potential that is dependent on temperature; a current generation circuit for allowing a temperature-dependent current to flow based on the temperature-dependent potential; a reference current generation circuit for generating a reference current that is independent of temperature; a capacitor that is charged alternately with the temperature-dependent current during a first charge period and the reference current during a second charge period; a pulse generation circuit for comparing a charged voltage of the capacitor with a reference voltage to generate a pulse; and a control circuit for alternately supplying the temperature-dependent current and the reference current to the capacitor. The temperature-dependent voltage generation circuit includes switches for switching connection relations between MOS transistors forming a current source circuit included in the temperature-dependent voltage generation circuit and bipolar transistors each serving as a load of the current source circuit.

6 Claims, 8 Drawing Sheets

TEMPERATURE SENSOR

RELATED APPLICATIONS

This application claims priority under 35 U.S.C. §119 to Japanese Patent Application No. 2008-292512 filed on Nov. 14, 2008, the entire content of which is hereby incorporated by reference.

BACKGROUND OF THE INVENTION

1. Field of the Invention

The present invention relates to a temperature sensor formed on a semiconductor device, and more particularly, to a temperature sensor for measuring ambient temperature of a semiconductor device.

2. Description of the Related Art

Conventionally, a thermometer utilizing a semiconductor device has been used for measuring an ambient temperature change or body temperature.

For example, there is known a technology of adjusting a circuit operation by controlling an oscillation frequency in accordance with temperature changes (see, for example, JP 2006-101489 A), and there is also known a temperature sensor that is capable of indicating temperature using the controlled oscillation frequency itself (http://japan.maxim-ic.com/quick_view2.cfm/qv_pk/3625, accessed on Nov. 11, 2008 (hereinafter referred to as Non-patent Document)).

In JP 2006-101489 A, as illustrated in FIG. 11, bipolar transistors Q1 to Q4 are used to generate a temperature-dependent current IPTAT, and then a mirror circuit formed of metal oxide semiconductor (MOS) transistors M1 and M2 is used to generate a current IIPTAT based on the temperature-dependent current IPTAT.

Then, a capacitor C1 is charged with the current IIPTAT, and a comparator compares a charged voltage of the capacitor C1 with a reference voltage Vref. When the charged voltage becomes higher than the reference voltage, an AND circuit U10A outputs a pulse. The charged voltage of the capacitor C1 is discharged in response to the pulse of the AND circuit U10A, and thereafter the charge to the capacitor C1 is restarted.

In other words, a time period necessary for the capacitor C1 to be charged to a voltage higher than the reference voltage Vref varies in accordance with an amount of the current IIPTAT, resulting in a pulse width containing temperature information.

By measuring the pulse width, the temperature may be measured indeed. However, due to manufacturing fluctuations in capacitor C1, the temperature is measured with low precision.

In view of this, in Non-patent Document, as a current with which the capacitor C1 is charged, a current Iref that is independent of temperature is additionally generated, and the capacitor C1 is charged alternately with the current IIPTAT and the current Iref, to thereby alternately generate pulses with the current IIPTAT and the current Iref, which correspond to the above-mentioned pulse. The temperature is measured by using a ratio between the pulses, to thereby suppress an error that may occur in temperature measurement due to the manufacturing fluctuations in the capacitor C1.

However, due to manufacturing fluctuations in bipolar transistors and MOS transistors, a value of the current IIPTAT deviates from its theoretical value. As a result, the charge to the capacitor C1 varies, and hence a pulse width that is accurately dependent on temperature cannot be generated. Thus, measurement precision cannot be improved by merely using a ratio between the current IIPTAT and the current Iref.

In particular, the current IIPTAT is generated based on a band gap of the bipolar transistor, whose potential difference is as small as several tens mV.

Therefore, in a circuit for generating the current IIPTAT based on the minute potential difference, when the manufacturing fluctuations are present in semiconductor elements forming the circuit, a significantly large error value is contained in a finally measured temperature. As a result, precise temperature measurement cannot be performed.

In particular, in a band gap reference circuit for generating a current IIPTAT, which is formed through a CMOS process, relative fluctuations in operational amplifier and MOS transistors forming a current source circuit become factors causing an error.

SUMMARY OF THE INVENTION

The present invention has been made in view of such circumstances described above, and it is an object thereof to provide a temperature sensor that is capable of performing more precise temperature measurement compared to conventional ones, even when manufacturing fluctuations are present in semiconductor elements forming a circuit for generating a temperature-dependent current.

A temperature sensor according to the present invention includes: a temperature-dependent voltage generation circuit (for example, circuit including metal oxide semiconductor (MOS) transistors M1 and M2, bipolar transistors BT1 and BT2, and an operational amplifier AP1 according to each of embodiments) for generating a temperature-dependent potential that is dependent on temperature; a current generation transistor that allows a temperature-dependent current to flow through the current generation transistor based on the temperature-dependent potential; a reference current generation circuit for generating a reference current that is independent of temperature; a capacitor that is charged alternately with the temperature-dependent current during a first charge period and the reference current during a second charge period; a pulse generation circuit (for example, circuit including a reference voltage circuit BT and a comparator CMP1 according to each of the embodiments) for comparing a charged voltage of the capacitor with a reference voltage to generate a pulse; and a control circuit (for example, circuit including flip-flops FF2 and FF3 or circuit including flip-flops FF2, FF3, and FF5 according to each of the embodiments) for alternately supplying the temperature-dependent current and the reference current to the capacitor, the control circuit outputting a temperature-dependent pulse having a time width that is dependent on temperature during the first charge period, and outputting a reference pulse having a time width that is independent of temperature during the second charge period, the temperature-dependent voltage generation circuit including: a current source circuit including a first MOS transistor and a second MOS transistor; a first bipolar transistor that outputs a first potential, the first bipolar transistor being connected with one of the first MOS transistor and the second MOS transistor as a load of the first bipolar transistor; a second bipolar transistor that outputs a second potential, the second bipolar transistor being connected via a resistor with another one of the first MOS transistor and the second MOS transistor as a load of the second bipolar transistor, the second bipolar transistor being used as a temperature sensor utilizing a band gap of the second bipolar transistor; a first selection switch for switching a connection destination of the first bipolar transistor to one of the first MOS transistor and the second MOS transistor; a second selection switch for switching a connection destination of the second bipolar transistor to another one of the first MOS transistor and the second MOS transistor; and an operational amplifier for amplifying a potential difference between the first potential and the second potential, and outputting a voltage determined by amplifying the potential difference to a gate of the first MOS transistor and a gate of the second MOS transistor.

In the temperature sensor according to the present invention, the control circuit is configured to: divide each of the first charge period and the second charge period into a first period and a second period; switch the first selection switch and the second selection switch between the first period and the second period of the each of the first charge period and the second charge period so that the connection destination of the first bipolar transistor is switched from the one of the first MOS transistor and the second MOS transistor to the another one of the first MOS transistor and the second MOS transistor and that the connection destination of the second bipolar transistor is switched from the another one of the first MOS transistor and the second MOS transistor to the one of the first MOS transistor and the second MOS transistor; and add together the first period and the second period of the each of the first charge period and the second charge period, to be output as the temperature-dependent pulse having the time width corresponding to the first charge period and the reference pulse having the time width corresponding to the second charge period, respectively.

The temperature sensor according to the present invention further includes: a third selection switch for selecting one of the first potential and the second potential to be input to an inverting input terminal of the operational amplifier; a fourth selection switch for selecting another one of the first potential and the second potential to be input to a non-inverting input terminal of the operational amplifier; and a fifth selection switch for switching an output of the operational amplifier between an inverting output and a non-inverting output, and the control circuit switches the third selection switch, the fourth selection switch, and the fifth selection switch in synchronization with a timing of switching the first selection switch and the second selection switch.

The temperature sensor according to the present invention further includes: a third selection switch for selecting one of the first potential and the second potential to be input to an inverting input terminal of the operational amplifier; a fourth selection switch for selecting another one of the first potential and the second potential to be input to a non-inverting input terminal of the operational amplifier; and a fifth selection switch for switching an output of the operational amplifier between an inverting output and a non-inverting output, and the control circuit is further configured to: divide the first charge period into a first sub charge period and a second sub charge period; switch the third selection switch, the fourth selection switch, and the fifth selection switch when a first pulse and a second pulse are output during the first sub charge period; and output, when the first pulse and the second pulse are output during the second sub charge period, as the temperature-dependent pulse, a pulse determined by dividing in frequency the first pulse and the second pulse output during the first sub charge period and the first pulse and the second pulse output during the second sub charge period.

In the temperature sensor according to the present invention, the capacitor includes: a first capacitor; and a second capacitor, the first capacitor and the second capacitor being switched for use for each capacitor charge period.

In the temperature sensor according to the present invention, the resistor is made of a material having such a temperature characteristic that a resistance of the resistor decreases as temperature increases.

According to the present invention, even when the manufacturing fluctuations are present, by switching the connections between the MOS transistors included in a current source circuit and the bipolar transistors, variations in current values containing offsets between the above-mentioned MOS transistors due to the manufacturing fluctuations are averaged so as to eventually make uniform the charge time periods for the capacitor. Accordingly, the above-mentioned offsets may be canceled to prevent the offset due to the manufacturing fluctuations from affecting the width of the temperature-dependent pulse. As a result, more precise temperature measurement compared to conventional ones may be performed.

DETAILED DESCRIPTION OF THE PREFERRED EMBODIMENTS

First Embodiment

Figure 1:
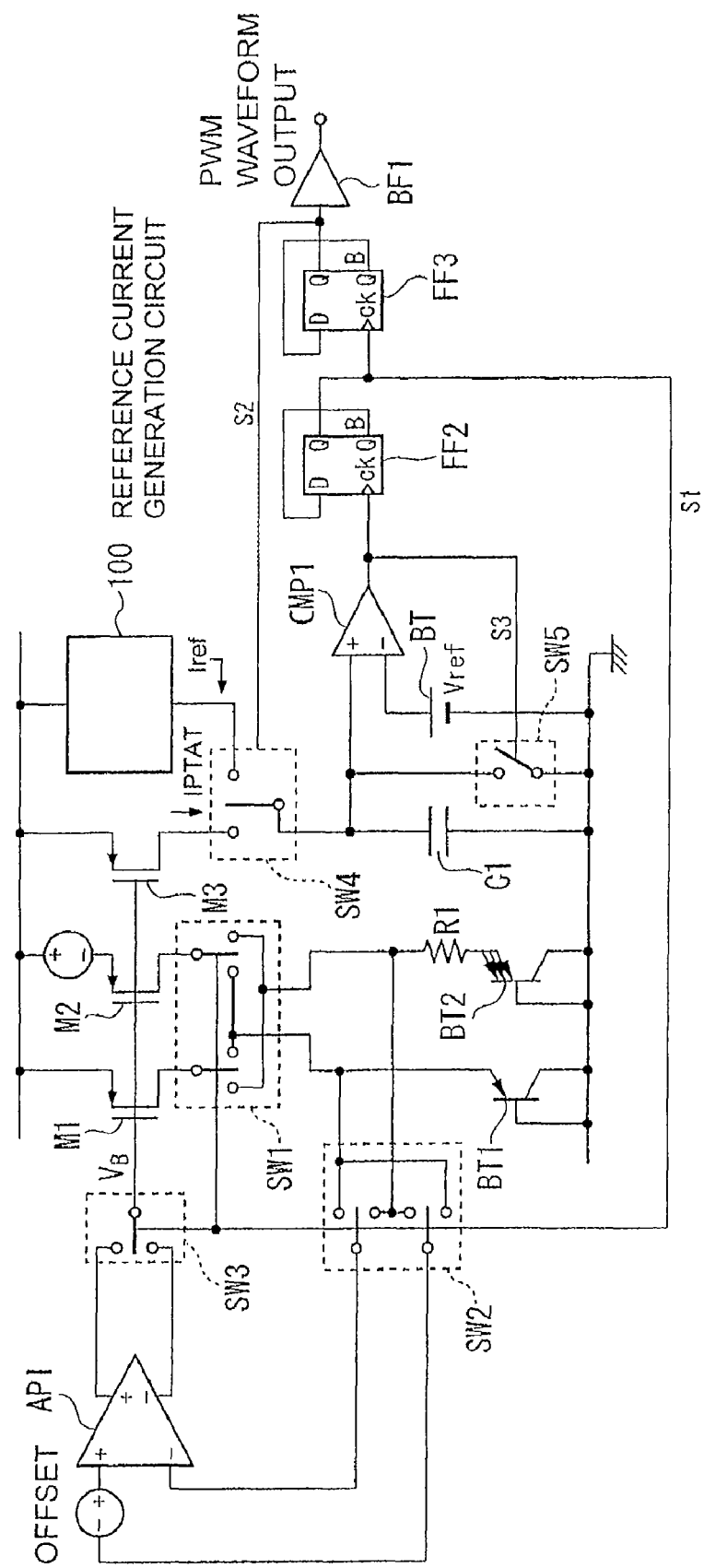
FIG. 1 is a block diagram illustrating a configuration example of a temperature sensor according to a first embodiment of the present invention.

Hereinafter, referring to the accompanying drawings, a temperature sensor according to a first embodiment of the present invention is described. FIG. 1 is a block diagram illustrating a configuration example of the temperature sensor according to the first embodiment of the present invention.

In FIG. 1, P-channel MOS transistors M1 and M2 form a current source circuit. Each of the MOS transistors M1 and M2 has a source applied with a power supply voltage. Further, a P-channel MOS transistor M3, which is described later, has a gate applied with the same bias voltage as that applied to gates of the MOS transistors M1 and M2 forming the current source circuit described above, to thereby establish a current source connection.

A bipolar transistor BT1 is a PNP bipolar transistor connected as a load of one of the above-mentioned MOS transistors M1 and M2.

A bipolar transistor BT2 is a PNP bipolar transistor connected as a load of another one of the MOS transistors M1 and M2 via a resistor R1. The resistor R1 has one terminal connected to an emitter of the bipolar transistor BT2, and another terminal connected to a terminal of a selection switch SW1. The bipolar transistor BT2 is formed so as to be larger in emitter area than the bipolar transistor BT1, and has a voltage Vbe (base-emitter voltage) varying in accordance with temperature. The bipolar transistor BT2 is used as a temperature sensor utilizing a band gap for outputting the potential Vbe. The bipolar transistor BT1 and the bipolar transistor BT2 described above are of the same type, but have different transistor sizes, resulting in different temperature characteristics. In other words, compared to the bipolar transistor BT1, the bipolar transistor BT2 has a more angled-inclination of decrease in voltage Vbe with respect to temperature changes. A difference ΔVbe between the potentials Vbe of the bipolar transistors BT1 and BT2 due to temperature changes is utilized to perform temperature measurement. Note that the difference ΔVbe increases monotonously with respect to an increase in temperature because of the reason as described above.

Each of the bipolar transistors BT1 and BT2 has a base and a collector that are connected to a ground.

The selection switch SW1 switches, in response to a control signal S1, a connection destination of a drain of the MOS transistor M1 to one of an emitter of the bipolar transistor BT1 and the another terminal of the resistor R1.

Further, the selection switch SW1 switches, in response to the above-mentioned control signal S1, a connection destination of a drain of the MOS transistor M2 to another one of the emitter of the bipolar transistor BT1 and the another terminal of the resistor R1.

For example, when the control signal S1 becomes "H" level, the selection switch SW1 connects the drain of the MOS transistor M1 with the emitter of the bipolar transistor BT1, and connects the drain of the MOS transistor M2 with the another terminal of the resistor R1.

On the other hand, when the control signal S1 becomes "L" level, the selection switch SW1 connects the drain of the MOS transistor M1 with the another terminal of the resistor R1, and connects the drain of the MOS transistor M2 with the emitter of the bipolar transistor BT1.

An operational amplifier AP1 has a non-inverting input terminal connected to one of the emitter of the bipolar transistor BT1 and the another terminal of the resistor R1, and an inverting input terminal connected to another one of the emitter of the bipolar transistor BT1 and the another terminal of the resistor R1. The operational amplifier AP1 performs control such that the difference ΔVbe between the voltage Vbe (first potential) of the bipolar transistor BT1 and the voltage Vbe (second potential) of the bipolar transistor BT2 may appear across the resistor R1, that is, a potential across the resistor R1 may become ΔVbe.

Besides, the operational amplifier AP1 amplifies a differential voltage between a voltage input to the non-inverting input terminal and a voltage input to the inverting input terminal. The operational amplifier AP1 outputs a voltage determined by amplifying the differential voltage from its non-inverting output terminal as its output voltage, and outputs a voltage determined by inverting a polarity of the amplified differential voltage from its inverting output terminal as its output voltage.

The selection switch SW2 switches, in response to a control signal S1, a connection destination of the non-inverting input terminal to one of the emitter of the bipolar transistor BT1 and the another terminal of the resistor R1.

Further, the selection switch SW2 switches, in response to the above-mentioned control signal S1, a connection destination of the inverting input terminal to another one of the emitter of the bipolar transistor BT1 and the another terminal of the resistor R1.

For example, when the control signal S1 becomes "H" level, the selection switch SW2 connects the non-inverting input terminal with the emitter of the bipolar transistor BT1, and connects the inverting input terminal with the another terminal of the resistor R1.

On the other hand, when the control signal S1 becomes "L" level, the selection switch SW2 connects the non-inverting input terminal with the another terminal of the resistor R1, and connects the inverting input terminal with the emitter of the bipolar transistor BT1.

A selection switch SW3 selects, in response to the control signal S1, which of the voltages output from the inverting output terminal and the non-inverting output terminal of the operational amplifier AP1 is to be output as a bias voltage VB that is supplied to the gates of the MOS transistors M1 and M2 and the like.

For example, when the control signal S1 becomes "H" level, the selection switch SW3 selects the output voltage of the non-inverting output terminal to be output as the bias voltage VB. On the other hand, when the control signal S1 becomes "L" level, the selection switch SW3 selects the output voltage of the inverting output terminal to be output as the bias voltage VB.

In other words, when each of the connection destinations of the non-inverting input terminal and the inverting input terminal of the operational amplifier AP1 is switched over by the selection switch SW2, in order to match a polarity of the output voltage of the operational amplifier AP1 with the polarity of the differential voltage between the non-inverting input terminal and the inverting input terminal, the selection switch SW3 switches between the non-inverting output terminal and the inverting output terminal in synchronization with the switching of the connection destinations of the non-inverting input terminal and the inverting input terminal.

The MOS transistor M3 is a P-channel MOS transistor, and has a source applied with the power supply voltage and the gate applied with the bias voltage VB. Then, as a current corresponding to the bias voltage VB, a temperature-dependent current IPTAT is output from a drain of the MOS transistor M3.

A reference current generation circuit 100 outputs a reference current Iref that is independent of temperature from its output terminal.

A capacitor C1 has one terminal connected to a terminal of a selection switch SW4, and another terminal connected to the ground.

The selection switch SW4 selects, in response to a control signal S2, which of the drain of the MOS transistor M3 and the output terminal of the reference current generation circuit 100 is to be connected to the above-mentioned one terminal of the capacitor C1.

For example, when the control signal S2 becomes "L" level, the selection switch SW4 connects the drain of the MOS transistor M3 with the one terminal of the capacitor C1. On the other hand, when the control signal S2 becomes "H" level, the selection switch SW4 connects the output terminal of the reference current generation circuit 100 with the one terminal of the capacitor C1.

A selection switch SW5 controls, in response to a control signal S3, whether the one terminal of the capacitor C1 is to be connected to the ground or not. For example, when the control signal S3 becomes "H" level, the selection switch SW5 connects the one terminal of the capacitor C1 with the ground.

A comparator CMP1 compares a reference voltage Vref that is output from a constant voltage source BT with a charged voltage that is being charged into the capacitor C1. The comparator CMP1 outputs the control signal S3 of "H" level when the charged voltage exceeds the reference voltage Vref, and outputs the control signal S3 of "L" level when the charged voltage is equal to or lower than the reference voltage Vref.

On this occasion, when the control signal S3 becomes "H" level, the selection switch SW5 causes the capacitor C1 to discharge its charged charges. When the charged voltage of the capacitor C1 is discharged, the charged voltage becomes equal to or lower than the reference voltage Vref. Accordingly, the comparator CMP1 changes the control signal S3 from "H" level to "L" level to be output. Therefore, the control signal S3 of "H" level is output as a one-shot pulse.

In the following description, each of flip-flops FFs latches data input to its data terminal D in response to a rising edge of a clock, and the data is output from its output terminal Q. Further, an output terminal QB of each of the flip-flops FFs outputs inverted data of the data output from the output terminal Q, that is, for example, "H" level in the case where the output terminal Q outputs "L" level. In this embodiment, in each of the flip-flops FFs, at the start of its operation, the output terminal Q outputs "L" level while the output terminal QB outputs "H" level.

The data terminal D and the output terminal QB of the flip-flop FF2 are connected with each other so that the flip-flop FF2 may function as a toggle flip-flop. The flip-flop FF2 has a clock terminal CK connected to an output terminal of the comparator CMP1, and the control signal S3 is input to the clock terminal CK. The output terminal Q is connected to a clock terminal CK of a subsequent flip-flop FF3, and outputs the control signal S1 as its output signal.

The data terminal D and the output terminal QB of the flip-flop FF3 are connected with each other so that the flip-flop FF3 may function as a toggle flip-flop. The flip-flop FF3 has the clock terminal CK connected to the output terminal Q of the flip-flop FF2. The clock terminal CK receives the output signal of the output terminal Q of the flip-flop FF2 as a clock signal. The output terminal Q of the flip-flop FF3 outputs the control signal S2.

A buffer BF1 has an input terminal connected to the output terminal Q of the flip-flop FF3, and an output terminal connected to a pulse width modulation (PWM) waveform output terminal from which a PWM waveform representing temperature measurement results is output.

Figure 2:
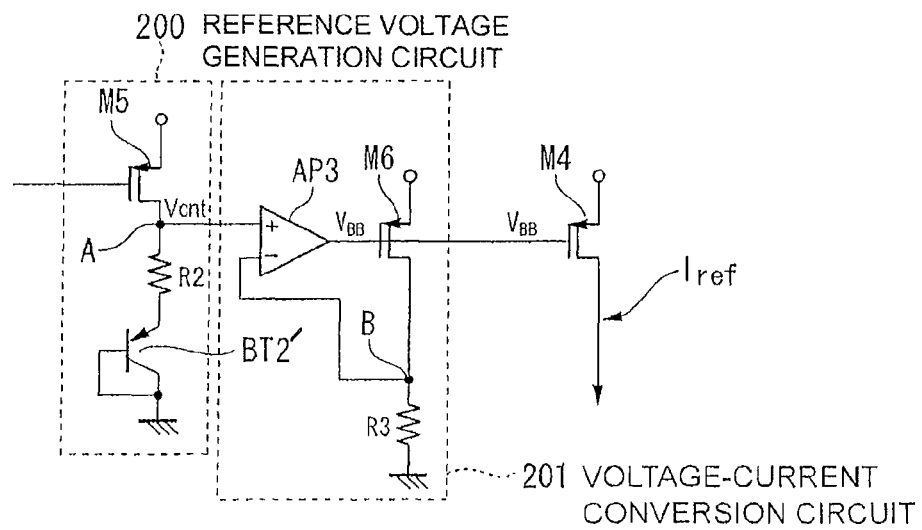
FIG. 2 is a block diagram illustrating a configuration example of a reference current generation circuit illustrated in FIG. 1.
Figure 3:
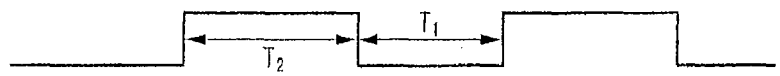
FIG. 3 is a conceptual waveform diagram for illustrating a relation between a first charge period and a second charge period in a pulse width modulation (PWM) waveform that is output as temperature measurement results.

Next, referring to FIG. 2, a configuration of the reference current generation circuit 100 illustrated in FIG. 1 is described. FIG. 2 is a block diagram illustrating a configuration example of the reference current generation circuit 100 illustrated in FIG. 1. In FIG. 3, a horizontal axis represents time while a vertical axis represents pulse level ("H" or "L" level).

The reference current generation circuit 100 includes a reference voltage generation circuit 200, a voltage-current conversion circuit 201, and a P-channel MOS transistor M4.

The MOS transistor M4 has a source applied with the power supply voltage, and a gate connected to an output terminal of the above-mentioned voltage-current conversion circuit 201 to be applied with a bias voltage VBB. Then, the reference current Iref corresponding to the bias voltage VBB is output from a drain of the MOS transistor M4.

The above-mentioned reference voltage generation circuit 200 includes a P-channel MOS transistor M5, a resistor R2, and a PNP bipolar transistor BT2'.

The MOS transistor M5 has a source applied with the power supply voltage, a gate applied with the bias voltage VB, and a drain connected to one terminal of the above-mentioned resistor R2 at a connection point A.

The bipolar transistor BT2' has an emitter connected to another terminal of the resistor R2, and a base and a collector that are connected to the ground.

In other words, the bipolar transistor BT2' is connected with the MOS transistor M5 as its load via the resistor R2.

Note that the resistor R2 of FIG. 2 is formed of a resistive element of the same type as that of the resistor R1 of FIG. 1. A voltage generated across the resistor R2 is a voltage determined by multiplying a voltage that is generated across the resistor R1 and has a positive temperature characteristic by a resistance ratio of the resistor R2 to the resistor R1. In other words, a current flowing through the resistor R2 has a positive temperature characteristic, and thus the voltage having a positive temperature characteristic is generated across the resistor R2. On the other hand, the voltage Vbe of the bipolar transistor BT2' decreases as temperature increases. Therefore, the change of the voltage Vbe due to the increase in temperature and the change of the voltage generated across the resistor R2 due to its positive temperature characteristic cancel each other. As a result, a voltage of the connection point A becomes a constant voltage Vcnt that is independent of temperature.

The above-mentioned voltage-current conversion circuit 201 includes an operational amplifier AP3, a P-channel MOS transistor M6, and a resistor R3.

The resistor R3 has one terminal connected to a drain of the above-mentioned MOS transistor M6 at a connection point B, and another terminal connected to the ground. Note that the resistor R3 is made of a material having a temperature-independent characteristic.

The operational amplifier AP3 has a non-inverting input terminal connected to the connection point A to be applied with the voltage Vcnt, and an inverting input terminal connected to the above-mentioned connection point B. Then, the bias voltage VBB is output from an output terminal of the operational amplifier AP3.

The MOS transistor M6 has a source applied with the power supply voltage, a gate connected to the output terminal of the above-mentioned operational amplifier AP3 to be applied with the bias voltage VBB, and a drain connected to the ground via the resistor R3.

With the configuration described above, the reference current generation circuit 100 outputs the reference current Iref that is independent of temperature.

With the configuration described above, the measurement results of the temperature sensor according to this embodiment are output in the form of the PWM waveform illustrated in FIG. 3.

Figure 4:
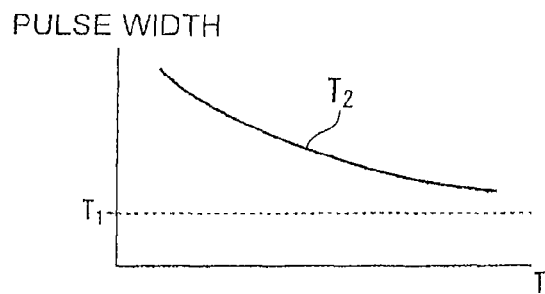
FIG. 4 is a graph illustrating changes of the first charge period and the second charge period due to their temperature characteristics.

In FIG. 3, a time width T1 represents a reference time width that is independent of temperature, and a time width T2 represents a temperature-dependent time width that is dependent on temperature as illustrated in a graph of FIG. 4. In FIG. 3, the vertical axis represents pulse level while the horizontal axis represents time. As illustrated in FIG. 4, the time width T2 reduces as temperature increases. In FIG. 4, a horizontal axis represents temperature while a vertical axis represents a pulse width (time width).

Specifically, the time width T1 corresponds to a time period necessary for the capacitor C1 to be charged to the reference voltage Vref with the reference current Iref. On the other hand, the time width T2 corresponds to a time period necessary for the capacitor C1 to be charged to the reference voltage Vref with the temperature-dependent current IPTAT.

On this occasion, temperature T as the measurement results may be determined in the following expression:

$$T = (T1/T2) \times \alpha - \beta$$

where $\alpha$ and $\beta$ each represent a coefficient.

Figure 5:
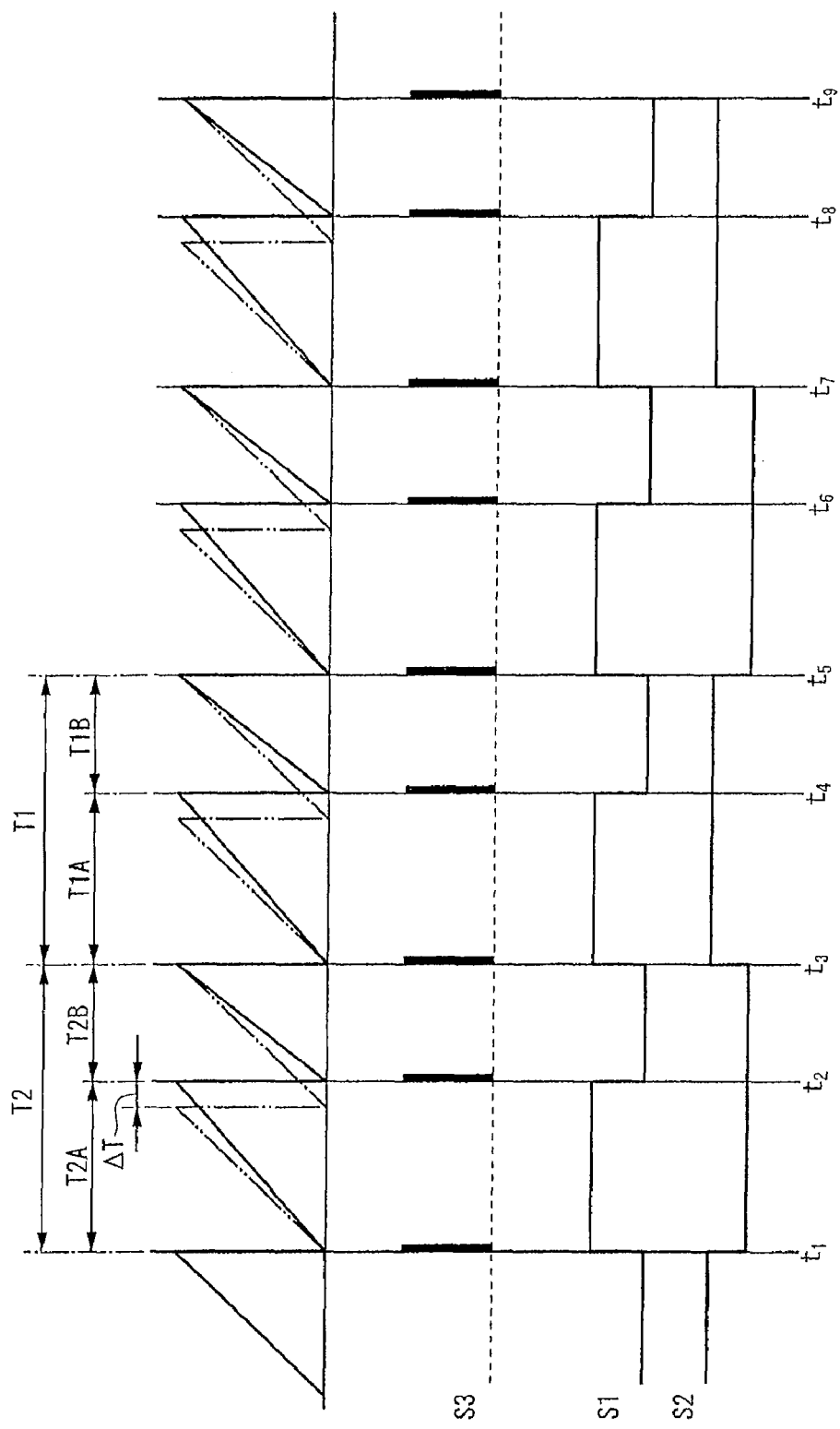
FIG. 5 is a timing chart for illustrating an operation of the temperature sensor of FIG. 1.

Next, referring to FIG. 5, an operation of the temperature sensor illustrated in FIG. 1 is described. FIG. 5 is a timing chart for illustrating an operation example of the temperature sensor of FIG. 1.

At a time point t1, a charged voltage that is being charged with the reference current Iref exceeds the reference voltage Vref, and accordingly the comparator CMP1 sets the control signal S3 to "H" level.

Then, the selection switch SW5 becomes a conduction state, and the charged voltage stored in the capacitor C1 is discharged.

After the discharge, the comparator CMP1 sets the control signal S3 to "L" level to be output. (Hereinafter, the operation described above is referred to as an operation of outputting a pulse of the control signal S3 by the comparator CMP1.)

Further, the flip-flop FF2 changes the output signal S1 from "L" level to "H" level in response to the rising edge to "H" level of the above-mentioned control signal S3.

Similarly, the flip-flop FF2 changes its output of the output terminal Q from "L" level to "H" level in response to the rising edge to "H" level of the above-mentioned control signal S3.

In response to the rising edge to "H" level of the output of the output terminal Q of the flip-flop FF2, the flip-flop FF3 changes the control signal S2 from "H" level to "L" level to be output from its output terminal Q.

Upon the change of the control signal S1 to "H" level, the selection switch SW1 connects the drain of the MOS transistor M1 with the emitter of the bipolar transistor BT1, and connects the drain of the MOS transistor M2 with the another terminal of the resistor R1.

Similarly, upon the change of the control signal S1 to "H" level, the selection switch SW2 connects the non-inverting input terminal of the operational amplifier AP1 with the emitter of the bipolar transistor BT1, and connects the inverting input terminal of the operational amplifier AP1 with the another terminal of the resistor R1.

In addition, upon the change of the control signal 51 to "H" level, the selection switch SW3 causes the output voltage of the non-inverting output terminal of the operational amplifier AP1 to be output as the bias voltage VB.

Upon the change of the control signal S2 to "L" level, the selection switch SW4 connects the drain of the MOS transistor M3 with the one terminal of the capacitor C1.

Due to this connection, the charge to the capacitor C1 is performed with the temperature-dependent current IPTAT.

Next, at a time point t2, the charged voltage of the capacitor C1 exceeds the reference voltage Vref, and accordingly the comparator CMP1 outputs a pulse of the control signal S3.

As a result, the flip-flop FF2 changes the control signal S1 from "H" level to "L" level to be output in response to a rising edge of the pulse of the control signal S3.

Similarly, the flip-flop FF2 changes its output of the output terminal Q from "H" level to "L" level in response to the rising edge of the pulse of the control signal S3.

At this time, the flip-flop FF3 continues to output the control signal S2 of "L" level.

Upon the change of the control signal S1 to "L" level, the selection switch SW1 connects the drain of the MOS transistor M1 with the another terminal of the resistor R1, and connects the drain of the MOS transistor M2 with the emitter of the bipolar transistor BT1.

Similarly, upon the change of the control signal S1 to "L" level, the selection switch SW2 connects the non-inverting input terminal of the operational amplifier AP1 with the another terminal of the resistor R1, and connects the inverting input terminal of the operational amplifier AP1 with the emitter of the bipolar transistor BT1.

In addition, upon the change of the control signal S1 to "L" level, the selection switch SW3 causes the output voltage of the non-inverting output terminal of the operational amplifier AP1 to be output as the bias voltage VB.

The control signal S2 of "L" level is continued to be output, and hence the selection switch SW4 continues the state in which the drain of the MOS transistor M3 is connected with the one terminal of the capacitor C1.

Due to this connection, the charge to the capacitor C1 is performed with the temperature-dependent current IPTAT.

Next, at a time point t3, the charged voltage of the capacitor C1 exceeds the reference voltage Vref, and accordingly the comparator CMP1 outputs a pulse of the control signal S3.

As a result, the flip-flop FF2 changes the control signal S1 from "L" level to "H" level to be output in response to a rising edge of the pulse of the control signal S3.

Similarly, the flip-flop FF2 changes its output of the output terminal Q from "L" level to "H" level in response to the rising edge of the pulse of the control signal S3.

In addition, the flip-flop FF3 changes the control signal S2 from "L" level to "H" level in response to a rising edge to "H" level of the output of the output terminal Q of the flip-flop FF2.

Upon the change of the control signal S1 to "H" level, the selection switch SW1 connects the drain of the MOS transistor M1 with the emitter of the bipolar transistor BT1, and connects the drain of the MOS transistor M2 with the another terminal of the resistor R1.

Similarly, upon the change of the control signal S1 to "H" level, the selection switch SW2 connects the non-inverting input terminal of the operational amplifier AP1 with the emitter of the bipolar transistor BT1, and connects the inverting input terminal of the operational amplifier AP1 with the another terminal of the resistor R1.

In addition, upon the change of the control signal S1 to "H" level, the selection switch SW3 causes the output voltage of the non-inverting output terminal of the operational amplifier AP1 to be output as the bias voltage VB.

Upon the change of the control signal S2 to "H" level, the selection switch SW4 connects the output terminal of the reference current generation circuit 100 with the one terminal of the capacitor C1.

Due to this connection, the charge to the capacitor C1 is performed with the reference current Iref.

Next, at a time point t4, the charged voltage of the capacitor C1 exceeds the reference voltage Vref, and accordingly the comparator CMP1 outputs a pulse of the control signal S3.

As a result, the flip-flop FF2 changes the control signal S1 from "H" level to "L" level to be output in response to a rising edge of the pulse of the control signal S3.

Similarly, the flip-flop FF2 changes its output of the output terminal Q from "H" level to "L" level in response to the rising edge of the pulse of the control signal S3.

At this time, the flip-flop FF3 continues to output the control signal S2 of "H" level.

Upon the change of the control signal S1 to "L" level, the selection switch SW1 connects the drain of the MOS transistor M1 with the another terminal of the resistor R1, and connects the drain of the MOS transistor M2 with the emitter of the bipolar transistor BT1.

Similarly, upon the change of the control signal S1 to "L" level, the selection switch SW2 connects the non-inverting input terminal of the operational amplifier AP1 with the another terminal of the resistor R1, and connects the inverting input terminal of the operational amplifier AP1 with the emitter of the bipolar transistor BT1.

In addition, upon the change of the control signal S1 to "L" level, the selection switch SW3 causes the output voltage of the inverting output terminal of the operational amplifier AP1 to be output as the bias voltage VB.

The control signal S2 of "H" level is continued to be output, and hence the selection switch SW4 continues the state in which the output terminal of the reference current generation circuit 100 is connected with the one terminal of the capacitor C1.

Due to this connection, the charge to the capacitor C1 is performed with the reference current Iref.

From a time point t5, the processing from the time point t1 to the time point t4 described above is repeatedly performed.

As described above, in this embodiment, the first charge period T2 during which the capacitor C1 is charged with the temperature-dependent current IPTAT is divided into two periods of T2A (for example, period between the time point t1 and the time point t2) and T2B (for example, period between the time point t2 and the time point t3). Between the two periods of T2A and T2B, combinations of the connections between the MOS transistors M1 and M2 and the bipolar transistors BT1 and BT2 are switched over by the selection switch SW1, to thereby cancel an offset between the MOS transistor M1 and the MOS transistor M2 due to their manufacturing fluctuations.

Similarly, between the above-mentioned two periods of T2A and T2B, combinations of the connections between the non-inverting input terminal and the inverting input terminal of the operational amplifier AP1 and the bipolar transistors BT1 and BT2 are switched over (including the switching between the inverting output terminal and the non-inverting output terminal) by the selection switches SW2 and SW3, to thereby cancel an offset between the non-inverting input terminal and the inverting input terminal of the operational amplifier AP1.

Then, as a time period required for the charge to the capacitor C1, the two periods of T2A and T2B are added together, that is, the pulse of the control signal S3 output from the comparator CMP1 is divided in frequency by the flip-flop FF3, to thereby generate the first charge period T2 having a time width determined by adding the two periods T2A and T2B together. Then, as a temperature-dependent pulse having the width of the first charge period T2, a PWM waveform ("H" level) is output via the buffer BF1.

Due to the offset between the MOS transistors M1 and M2 and the offset between the non-inverting input terminal and the inverting input terminal of the operational amplifier AP1 described above, a current value of the temperature-dependent current IPTAT varies depending on the products. Specifically, in FIG. 5, though a broken line illustrated between the time point t1 and the time point t3 indicates an ideal change of the charged voltage of the capacitor C1, an actual change thereof appears as a solid line to have such an error ΔT as described above.

In view of this, in this embodiment, as described above, the error ΔT between the charge time period T2A and the charge time period T2B due to the variation in temperature-dependent current IPTAT is canceled by switching the combinations of the connections between the MOS transistors M1 and M2 and the bipolar transistors BT1 and BT2 as well as by switching the combinations of the connections between the non-inverting input terminal and the inverting input terminal of the operational amplifier AP1 and the bipolar transistors BT1 and BT2.

As a result, according to this embodiment, an error that may occur in temperature measurement results due to the variations among the products may be suppressed, to thereby perform precise temperature measurement with a small error among the products.

Further, in this embodiment, similarly to the first charge period T2, the second charge period T1 during which the capacitor C1 is charged with the reference current Iref is also divided into periods of T1A and T1B for the charge processing. The pulse of the control signal S3 output from the comparator CMP1 is divided in frequency by the flip-flop FF3, to thereby generate the second charge period T1 having a time width determined by adding the two periods of T1A and T1B together. Then, as a temperature-dependent pulse having the width of the second charge period T1, a PWM waveform ("L" level) is output via the buffer BF1.

Further, instead of providing the selection switch SW2 and the selection switch SW3, the following configuration may be adopted. That is, the non-inverting input terminal of the operational amplifier AP1 is connected with the emitter of the bipolar transistor BT1, the inverting input terminal thereof is connected with the another terminal of the resistor R1, and the bias voltage VB is output from the non-inverting output terminal thereof. In this configuration, only the combinations of the connections between the MOS transistors M1 and M2 and the bipolar transistors BT1 and BT2 may be switched over, to thereby cancel only the offset between the MOS transistors M1 and M2.

Second Embodiment

Figure 6:
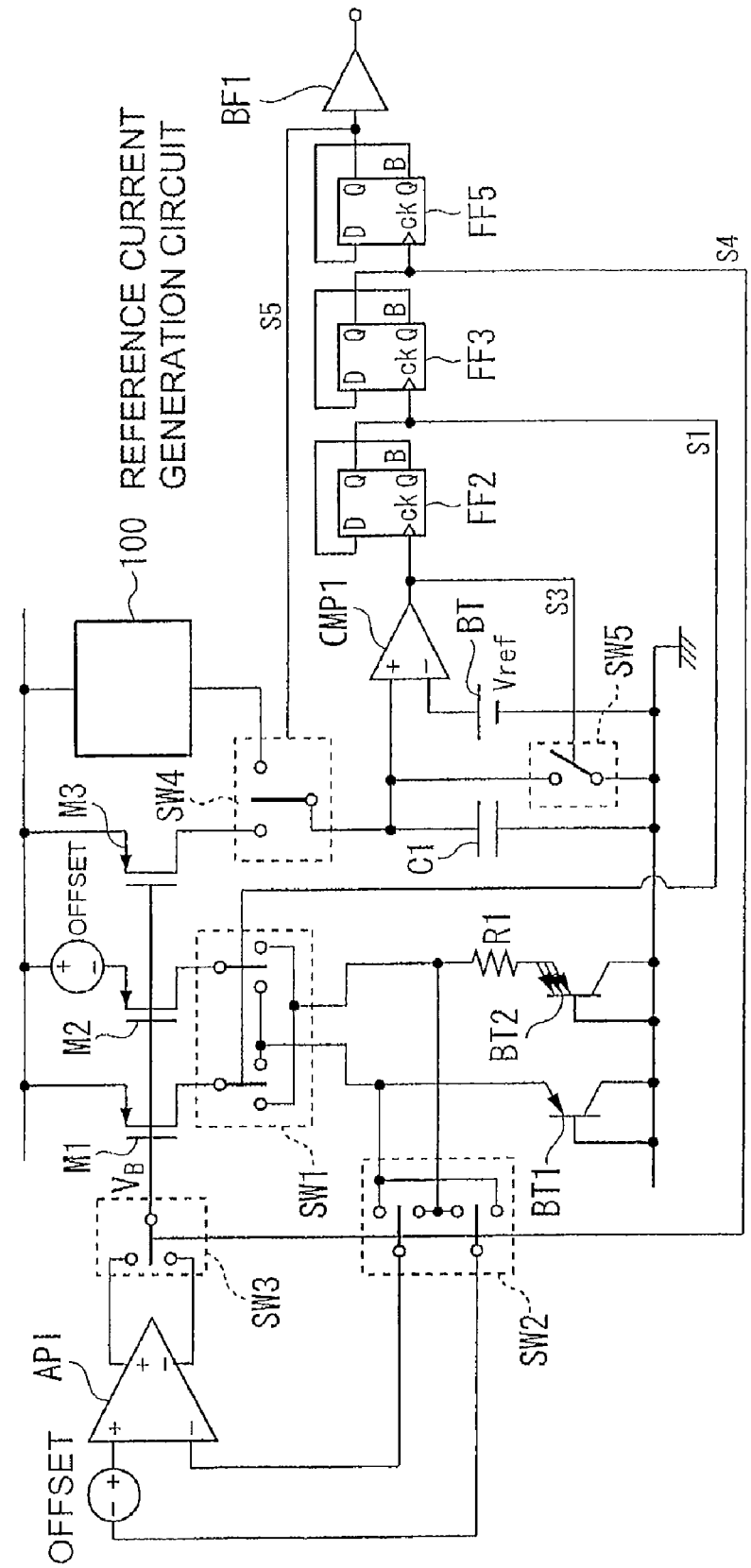
FIG. 6 is a block diagram illustrating a configuration example of a temperature sensor according to a second embodiment of the present invention.

Next, referring to the accompanying drawings, a temperature sensor according to a second embodiment of the present invention is described. FIG. 6 is a block diagram illustrating a configuration example of the temperature sensor according to the second embodiment of the present invention.

The same component as that of FIG. 1 illustrating the first embodiment is denoted by the same reference symbol, and description thereof is omitted. Hereinafter, only a configuration and an operation according to the second embodiment different from those of the first embodiment are described.

A newly-added component is a flip-flop FF5.

The flip-flop FF5 is provided at a subsequent stage of the flip-flop FF3. A data terminal D and an output terminal QB of the flip-flop FF5 are connected with each other so that the flip-flop FF5 may function as a toggle flip-flop. The flip-flop FF5 has a clock terminal CK that is connected to the output terminal Q of the flip-flop FF3 and receives a control signal S4, which is the output signal of the output terminal Q of the flip-flop FF3. The flip-flop FF5 outputs a control signal S5 from its output terminal Q.

Similarly to the first embodiment, the selection switch SW1 operates to switch, in response to the control signal S1, the combinations of the connections between the MOS transistors M1 and M2 and the bipolar transistors BT1 and BT2.

On the other hand, the selection switches SW2 and SW3 operate to switch, in response to the control signal S4, the combinations of the connections between the non-inverting input terminal and the inverting input terminal of the operational amplifier AP1 and the bipolar transistors BT1 and BT2.

For example, when the control signal S4 becomes "H" level, the selection switch SW2 connects the non-inverting input terminal of the operational amplifier AP1 with the emitter of the bipolar transistor BT1, and connects the inverting input terminal of the operational amplifier AP1 with the another terminal of the resistor R1.

On the other hand, when the control signal S4 becomes "L" level, the selection switch SW2 connects the non-inverting input terminal of the operational amplifier AP1 with the another terminal of the resistor R1, and connects the inverting input terminal of the operational amplifier AP1 with the emitter of the bipolar transistor BT1.

Further, a selection switch SW3 selects, in response to the control signal S4, which of the voltages output from the non-inverting output terminal and the inverting output terminal of the operational amplifier AP1 is to be output as a bias voltage VB that is supplied to the MOS transistors M1 and M2 and the like.

For example, when the control signal S4 becomes "H" level, the selection switch SW3 selects the output voltage of the non-inverting output terminal to be output as the bias voltage VB. On the other hand, when the control signal S4 becomes "L" level, the selection switch SW3 selects the output voltage of the inverting output terminal to be output as the bias voltage VB.

In other words, when each of the connection destinations of the non-inverting input terminal and the inverting input terminal of the operational amplifier AP1 is switched over by the selection switch SW2, in order to match a polarity of the output voltage of the operational amplifier AP1 with the polarity of the differential voltage between the non-inverting input terminal and the inverting input terminal, the selection switch SW3 switches between the non-inverting output terminal and the inverting output terminal in synchronization with the switching of the connection destinations of the non-inverting input terminal and the inverting input terminal.

Figure 7:
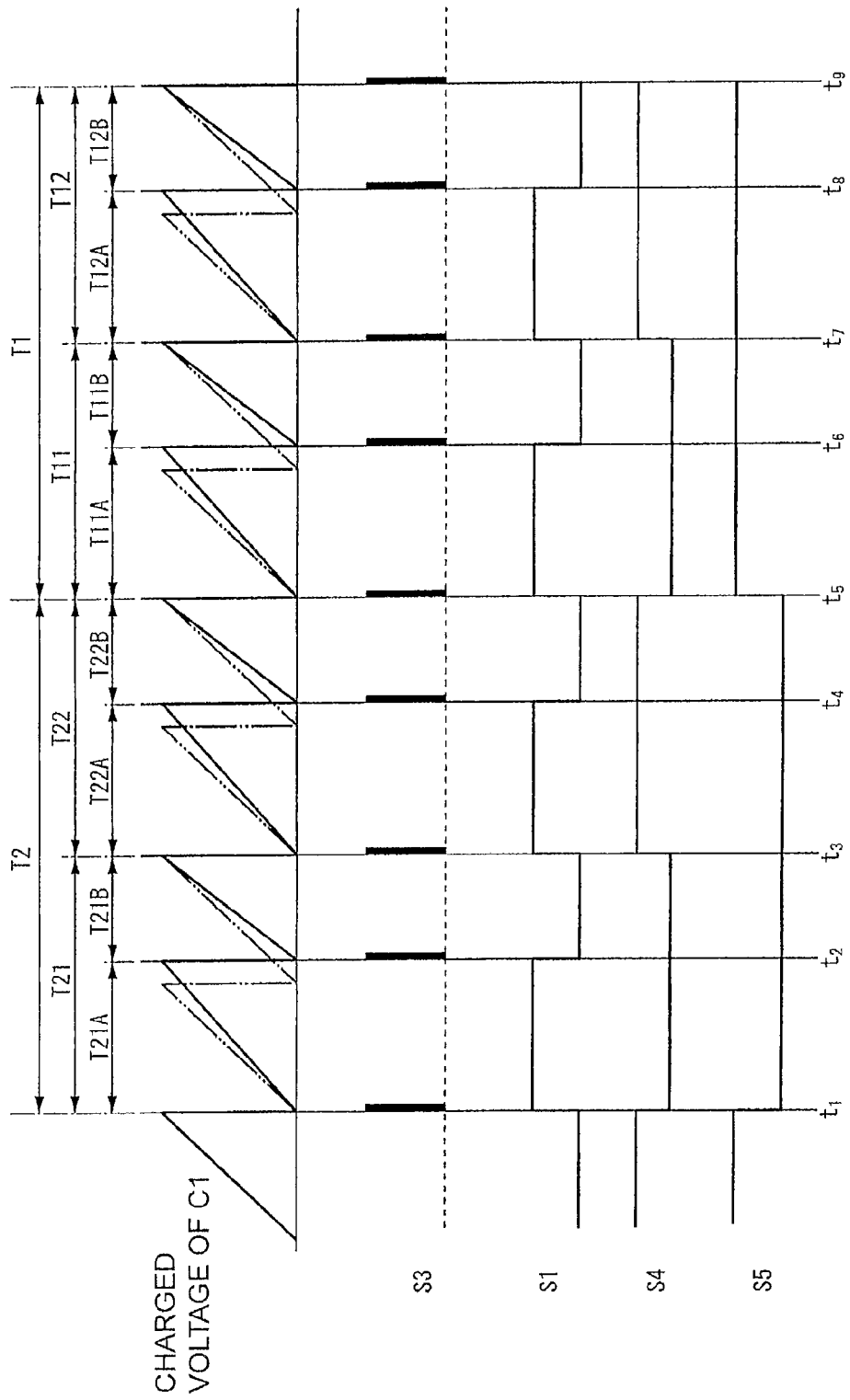
FIG. 7 is a timing chart for illustrating an operation of the temperature sensor of FIG. 6.

As described above, in the second embodiment, as illustrated in a timing chart of FIG. 7, a first charge period T2 during which a PWM waveform shows "L" level is divided into sub periods T21 and T22. The sub period T21 is further divided into a period T21A and a period T21B, and the sub period T22 is further divided into a period T22A and a period T22B.

Similarly, a second charge period T1 is divided into sub periods T11 and T12. The sub period T11 is further divided into a period T11A and a period T11B, and the sub period T12 is further divided into a period T12A and a period T12B.

Operations of switching the combinations of the connections between the MOS transistors M1 and M2 and the bipolar transistors BT1 and BT2 performed by the selection switch SW1 at time points t1, t3, t5, and t7 in response to the control signal S1 are identical with the operations performed at the time points t1, t3, t5, and t7 according to the first embodiment.

Further, operations of switching the combinations of the connections between the MOS transistors M1 and M2 and the bipolar transistors BT1 and BT2 performed by the selection switch SW1 at time points t2, t4, t6, and t8 in response to the control signal S1 are identical with the operations performed at the time points t2, t4, t6, and t8 according to the first embodiment.

Further, operations of switching the combinations of the connections between the non-inverting input terminal and the inverting input terminal of the operational amplifier AP1 and the bipolar transistors BT1 and BT2 (as well as of switching between the inverting output terminal and the non-inverting output terminal) performed by the selection switches SW2 and SW3 at the time points t1 and t5 in response to the control signal S4 are identical with the operations performed at the time points t2, t4, t6, and t8 according to the first embodiment.

Similarly, operations of switching the combinations of the connections between the non-inverting input terminal and the inverting input terminal of the operational amplifier AP1 and the bipolar transistors BT1 and BT2 (as well as of switching between the inverting output terminal and the non-inverting output terminal) performed by the selection switches SW2 and SW3 at the time points t3 and t7 in response to the control signal S4 are identical with the operations performed at the time points t1, t3, t5, and t7 according to the first embodiment.

Further, an operation of selecting the combination of the connection between the another terminal of the capacitor C1, and the drain of the MOS transistor M3 and the output terminal of the reference current generation circuit 100 performed by the selection switch SW4 at the time point t1 in response to the control signal S5 is identical with the operations performed at the time points t1 and t5 according to the first embodiment.

Similarly, an operation of selecting the combination of the connection between the another terminal of the capacitor C1, and the drain of the MOS transistor M3 and the output terminal of the reference current generation circuit 100 performed by the selection switch SW4 at the time point t5 in response to the control signal S5 is identical with the operations performed at the time points t3 and t7 according to the first embodiment.

As described above, each of the first charge period T2 and the second charge period T1 is divided into the four periods. In the divided four periods, the combinations of the connections between the non-inverting input terminal and the inverting input terminal of the operational amplifier AP1 and the bipolar transistors BT1 and BT2 are switched over every two periods, and the combinations of the connections between the MOS transistors M1 and M2 and the bipolar transistors BT1 and BT2 are switched over every period. Thus, compared to the first embodiment, the combinations of the connections among the respective elements are switched over more frequently. As a result, the degrees of canceling the offsets among the respective elements are improved, to thereby perform more precise measurement.

In each period corresponding to the charge time period for the capacitor C1 (period T21A, T21B, T22A, T22B, T11A, T11B, T12A, or T12B), the control signal S3 output from the comparator CMP1 is divided in frequency by 4, and accordingly a PWM waveform representing the first charge period T2 and the second charge period T1 is output via the buffer BF1.

Third Embodiment

Figure 8:
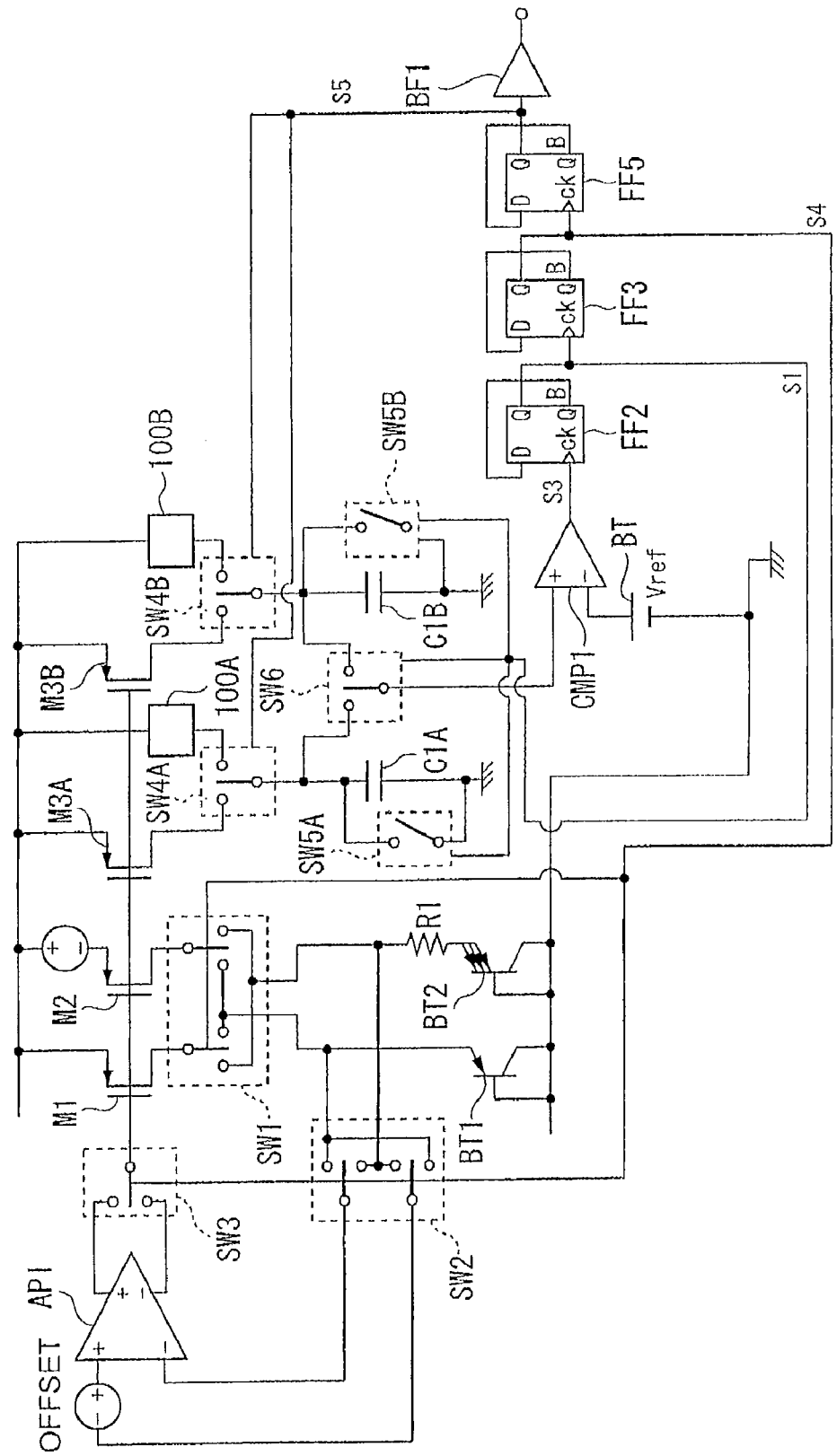
FIG. 8 is a block diagram illustrating a configuration example of a temperature sensor according to a third embodiment of the present invention.

Next, referring to the accompanying drawings, a temperature sensor according to a third embodiment of the present invention is described. FIG. 8 is a block diagram illustrating a configuration example of the temperature sensor according to the third embodiment of the present invention.

The same component as that of FIG. 6 illustrating the second embodiment is denoted by the same reference symbol, and description thereof is omitted. Hereinafter, only a configuration and an operation according to the third embodiment different from those of the second embodiment are described.

In the third embodiment of the present invention, a newly-added component is a selection switch SW6.

Further, in the third embodiment, a capacitor C1A and a capacitor C1B are provided instead of the capacitor C1 according to the second embodiment. Similarly, a selection switch SW4A and a selection switch SW4B are provided instead of the selection switch SW4 according to the second embodiment. A selection switch SW5A and a selection switch SW5B are provided instead of the selection switch SW5 according to the second embodiment. A MOS transistor M3A and a MOS transistor M3B are provided instead of the MOS transistor M3 according to the second embodiment. The selection switches SW5A and SW5B respectively perform discharge processing on the capacitors C1A and C1B in response to the control signal S1. Upon the turning on/off of the selection switches SW5A and SW5B in response to the control signal S1, one of the capacitors C1A and C1B becomes a charged state while another one becomes a discharged state. In other words, when the control signal S1 becomes "L" level, the selection switch SW5A becomes an ON-state while the selection switch SW5B becomes an OFF-state. On the other hand, when the control signal S1 becomes "H" level, the selection switch SW5A becomes the OFF-state while the selection switch SW5B becomes the ON-state.

Further, a reference current generation circuit 100A and a reference current generation circuit 100B are provided instead of the reference current generation circuit 100 according to the second embodiment.

Further, similarly to the selection switch SW2 and the selection switch SW3, the selection switch SW1 is controlled to be switched over in response to the control signal S4.

For example, when the control signal S4 becomes "H" level, the selection switch SW1 connects the drain of the MOS transistor M1 with the emitter of the bipolar transistor BT1, and connects the drain of the MOS transistor M2 with the another terminal of the resistor R1.

On the other hand, when the control signal S4 becomes "L" level, the selection switch SW1 connects the drain of the MOS transistor M1 with the another terminal of the resistor R1, and connects the drain of the MOS transistor M2 with the emitter of the bipolar transistor BT1.

Each of the MOS transistors M3A and M3B is a P-channel MOS transistor, and has a source applied with the power supply voltage and a gate applied with the bias voltage VB.

Each of the reference current generation circuits 100A and 100B has the same configuration as that of the reference current generation circuit 100, and outputs the reference current Iref.

The capacitor C1A has one terminal connected to a terminal of the selection switch SW4A, and another terminal connected to the ground.

The capacitor C1B has one terminal connected to a terminal of the selection switch SW4B, and another terminal connected to the ground.

The selection switch SW4A switches, in response to the control signal S5, a connection of the one terminal of the capacitor C1A to one of a drain of the MOS transistor M3A and the reference current generation circuit 100A.

For example, when the control signal S5 becomes "L" level, the selection switch SW4A connects the drain of the MOS transistor M3A with the one terminal of the capacitor C1A. On the other hand, when the control signal S5 becomes "H" level, the selection switch SW4A connects the reference current generation circuit 100A with the one terminal of the capacitor C1A.

The selection switch SW4B switches, in response to the control signal S5, a connection of the one terminal of the capacitor C1B to one of a drain of the MOS transistor M3B and the reference current generation circuit 100B.

For example, when the control signal S5 becomes "L" level, the selection switch SW4B connects the drain of the MOS transistor M3B with the one terminal of the capacitor C1B. On the other hand, when the control signal S5 becomes "H" level, the selection switch SW4B connects the reference current generation circuit 100B with the one terminal of the capacitor C1B.

The selection switch SW6 switches, in response to the control signal S1, a connection of one of the one terminal of the capacitor C1A and the one terminal of the capacitor C1B to the non-inverting input terminal of the comparator CMP1.

For example, when the control signal S1 becomes "L" level, the selection switch SW6 connects the one terminal of the capacitor C1A with the non-inverting input terminal of the comparator CMP1. On the other hand, when the control signal S1 becomes "H" level, the selection switch SW6 connects the one terminal of the capacitor C1B with the non-inverting input terminal of the comparator CMP1.

With the configuration described above, in this embodiment, a charged voltage with which the reference voltage Vref is compared in the comparator CMP1 is alternately selected between the charged voltages of the capacitors C1A and C1B. For example, in the timing chart of FIG. 7, the charged voltage with which the reference voltage Vref is compared in the comparator CMP1 at the time point t2 is the one being charged into the capacitor C1A. On the other hand, the charged voltage with which the reference voltage Vref is compared in the comparator CMP1 at the time point t3 is the one being charged into the capacitor C1B. In other words, for each period corresponding to the charge time period (period T21A, T21B, T22A, T22B, T11A, T11B, T12A, or T12B), a capacitor whose charged voltage is to be compared with the reference voltage Vref is switched alternately to one of the capacitors C1A and C1B by the selection switch SW6.

Thus, in this embodiment, in order that a time period necessary for the capacitor C1 to be discharged may be prevented from causing each time width of the charge periods T1 and T2 to be larger to result in a measurement error, the two capacitors C1A and C1B are provided so that one of the two capacitors starts to be charged at a time when another one starts to be discharged. Therefore, a measurement error caused by the discharge time period may be suppressed.

Further, also in the first embodiment, it is possible to adopt the above-mentioned configuration, which uses the capacitors C1A and C1B. In the case of adopting this configuration in the first embodiment, the control signal S2 is used as the control signal for controlling the selection switch SW4A and the selection switch SW4B.

Fourth Embodiment

A fourth embodiment of the present invention has a configuration in which the resistor R1 according to each of the first to third embodiments is replaced with one made of a material having a temperature-dependent characteristic.

Figure 9:
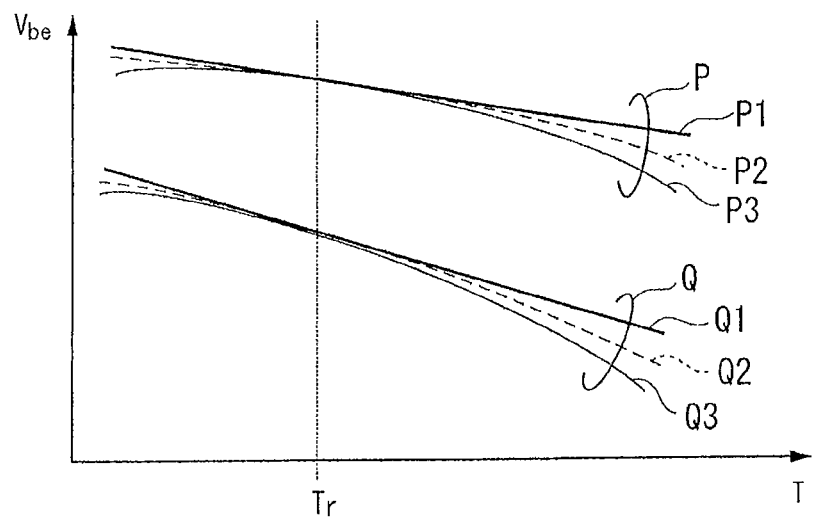
FIG. 9 is a graph illustrating changes of voltages of bipolar transistors with respect to temperature.

FIG. 9 is a graph illustrating temperature changes of the voltages Vbe of the bipolar transistor BT1 and the bipolar transistor BT2.

The temperature change of the voltage Vbe of the bipolar transistor BT1 is represented by P while the temperature change of the voltage Vbe of the bipolar transistor BT2 is represented by Q.

A straight line P1 and a straight line Q1 respectively indicate ideal changes of the voltages Vbe of the bipolar transistor BT1 and the bipolar transistor BT2, but actual changes thereof respectively appear as a curved line P3 and a curved line Q3 each containing quadratic components.

In other words, in the following Equation (1) expressing the temperature-dependent characteristic of the voltage Vbe of the bipolar transistor, the term of G contains a square-law component of a temperature ratio between a temperature difference ΔTr (that is, "T−Tr") and a reference temperature Tr (25° C. in this embodiment) as expressed in Equation (2), which results in linearity distortion. As a result, as indicated as the line P3 and the line Q3, the bipolar transistors BT1 and BT2 have the characteristics deviating from the ideal lines P1 and Q1 on both sides with respect to the reference temperature Tr. The operational amplifier AP1 operates so that the difference ΔVbe may accurately appear across the resistor R1 so as to equalize with each other the voltage Vbe of the bipolar transistor BT1 and the voltage of the another terminal of the resistor R1.

On this occasion, though an ideal difference ΔVbe increases linearly with respect to temperature, an actual difference ΔVbe does not increase linearly because of the reason described above, resulting in an error.

[Equation 1]

$$VBe = Vg\left(1 - \frac{T}{Tr}\right) + \frac{T}{Tr}Vbe(Tr) - \underbrace{\eta\frac{kT}{q}\ln\frac{T}{Tr}}_{G} + \frac{kT}{q}\ln\frac{I_{(T)}}{I_{(Tr)}} \quad (1)$$

[Equation 2]

$$\eta\frac{kTr}{q}\cdot\left(\frac{\Delta Tr}{Tr}\right)^2 \quad (2)$$

in the case of "T−Tr≪Tr"

To make the respective actual characteristic lines approximate to the ideal lines P1 and Q1, the characteristic of the resistor expressed in Equation (3) is utilized.

[Equation 3]

$$R(T) = R(Tr)\cdot\{1 + TC1(T - Tr)\}\{1 + TC2(T - Tr)^2\} \quad (3)$$
$$= R(Tr)(1 + \Delta T\cdot TC1)\cdot(1 + \Delta T^2\cdot TC2)$$

In Equation (3), TC1 represents a first-order temperature coefficient, and TC2 represents a second-order temperature coefficient.

In other words, as understood from the term of "(1+ ΔT²·TC2)" in Equation (3), the resistor has a square-law characteristic with respect to the temperature difference. In this case, ΔT corresponds to "T−Tr".

Therefore, when a material whose resistance decreases with respect to temperature is used for the resistor, a current flowing through the bipolar transistor increases in accordance with temperature changes. As a result, an error Terr between an output of the temperature sensor and a true value has such a temperature characteristic that the error Terr changes as illustrated in FIG. 10B, owing to the resistor.

Figure 10A:
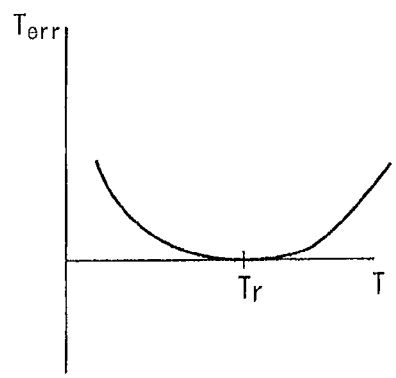
FIG. 10A is a graph illustrating a change of an error between an output of the temperature sensor and a true value according to a voltage change in the bipolar transistor with respect to temperature.

On the other hand, because of the influence of the term of G in Equation (1) described above regarding the bipolar transistor, the error Ten between the output of the temperature sensor and the true value has such a temperature characteristic that the error Terr changes as illustrated in FIG. 10A, owing to the bipolar transistor.

Figure 10B:
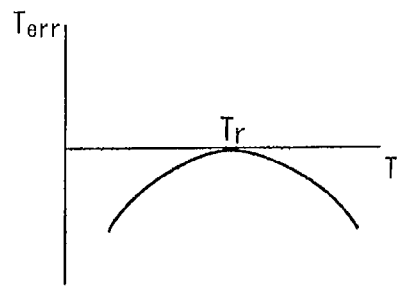
FIG. 10B is a graph illustrating a change of the error between the output of the temperature sensor and the true value according to a resistance change in a resistor with respect to temperature.
Figure 11:
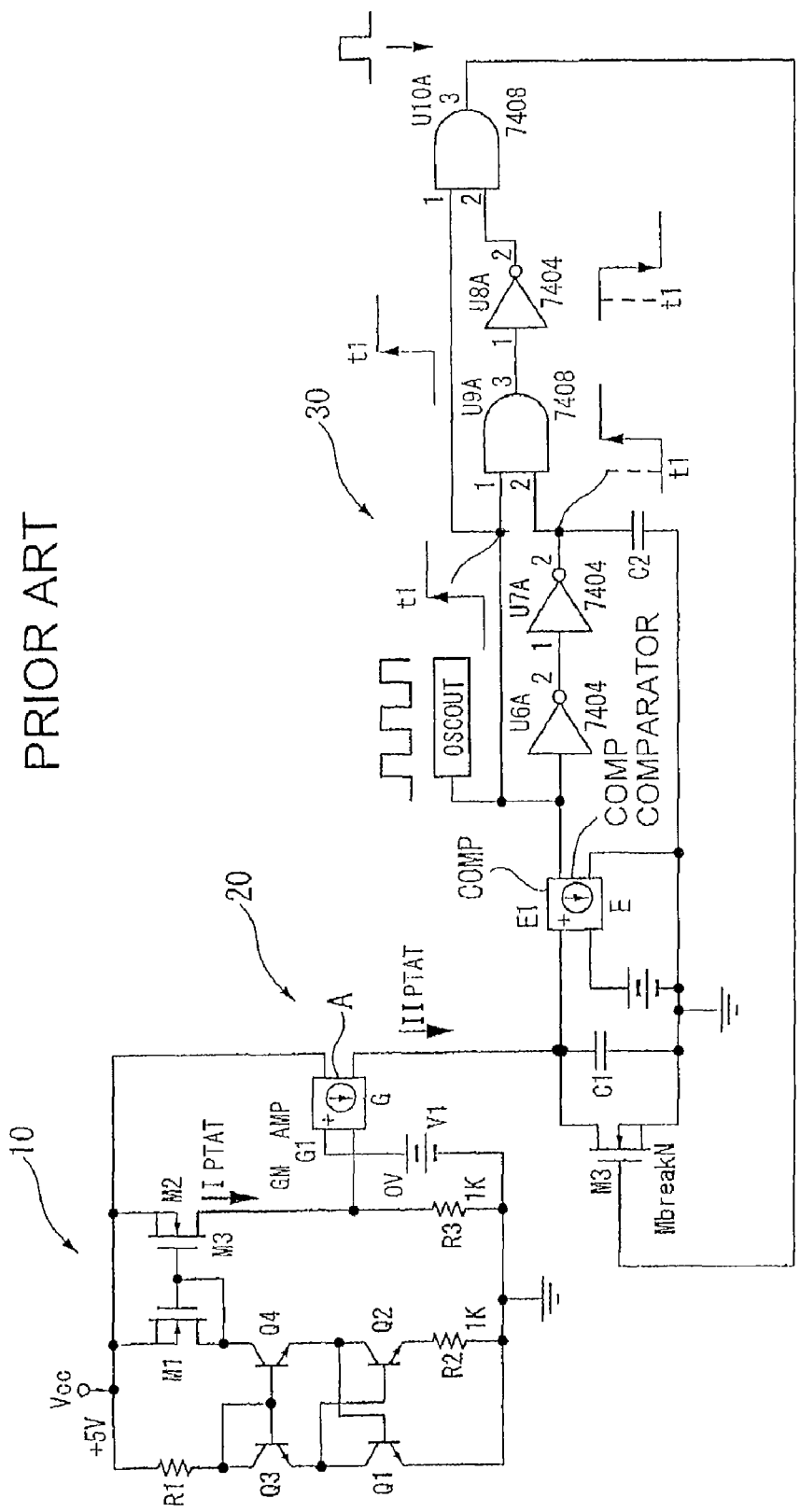
FIG. 11 is a block diagram illustrating a conventional configuration for adjusting a circuit operation by controlling an oscillation frequency in accordance with temperature changes.

The change illustrated in FIG. 10A and the change illustrated in FIG. 10B described above cancel each other. Therefore, the temperature characteristics of the voltages Vbe of FIG. 9 may be made approximate from the line P3 to a line P2 and from the line Q3 to a line Q2 so as to approximate to the ideal characteristic lines P1 and Q1, respectively. Accordingly, the temperature characteristic of the difference ΔVbe may be made to approximate to such a characteristic that the difference ΔVbe increases linearly with respect to temperature, to thereby improve precision of temperature measurement.

What is claimed is:
1. A temperature sensor, comprising:
a temperature-dependent voltage generation circuit for generating a temperature-dependent potential that is dependent on temperature;
a current generation transistor that allows a temperature-dependent current to flow through the current generation transistor based on the temperature-dependent potential;
a reference current generation circuit for generating a reference current that is independent of temperature;
a capacitor that is charged alternately with the temperature-dependent current during a first charge period and that is charged with the reference current during a second charge period;
a pulse generation circuit for comparing a charged voltage of the capacitor with a reference voltage to generate a pulse; and
a control circuit for alternately supplying the temperature-dependent current and the reference current to the capacitor, the control circuit outputting a temperature-dependent pulse having a time width that is dependent on temperature during the first charge period, and outputting a reference pulse having a time width that is independent of temperature during the second charge period,
the temperature-dependent voltage generation circuit comprising:
a current source circuit comprising a first metal oxide semiconductor (MOS) transistor and a second MOS transistor;
a first bipolar transistor that outputs a first base-emitter voltage varying with temperature, the first bipolar transistor being connected with one of the first MOS transistor and the second MOS transistor as a load of the first bipolar transistor;
a second bipolar transistor that outputs a second base-emitter voltage varying with temperature, the second bipolar transistor being connected via a resistor with another one of the first MOS transistor and the second MOS transistor as a load of the second bipolar transistor, the second bipolar transistor being used as a temperature sensor utilizing a band gap of the second bipolar transistor;
a first selection switch for switching a connection destination of the first bipolar transistor to one of the first MOS transistor and the second MOS transistor;

a second selection switch for switching a connection destination of the second bipolar transistor to another one of the first MOS transistor and the second MOS transistor; and an operational amplifier for amplifying a voltage difference between the first base-emitter voltage and the second base-emitter voltage, wherein the voltage difference varies due to temperature changes, and outputting the temperature-dependent potential determined by amplifying the voltage difference to a gate of the first MOS transistor and a gate of the second MOS transistor from one of an inverting terminal and a non-inverting terminal of the operational amplifier.

2. A temperature sensor according to claim 1, wherein the control circuit is configured to:

divide each of the first charge period and the second charge period into a first period and a second period;

switch the first selection switch and the second selection switch between the first period and the second period of the each of the first charge period and the second charge period so that the connection destination of the first bipolar transistor is switched from the one of the first MOS transistor and the second MOS transistor to the another one of the first MOS transistor and the second MOS transistor and that the connection destination of the second bipolar transistor is switched from the another one of the first MOS transistor and the second MOS transistor to the one of the first MOS transistor and the second MOS transistor; and add together the first period and the second period of the each of the first charge period and the second charge period, to be output as the temperature-dependent pulse having the time width corresponding to the first charge period and the reference pulse having the time width corresponding to the second charge period, respectively.

3. A temperature sensor according to claim 2, further comprising:

a third selection switch for selecting one of the first base-emitter voltage and the second base-emitter voltage to be input to an inverting input terminal of the operational amplifier;

a fourth selection switch for selecting another one of the first base-emitter voltage and the second base-emitter voltage to be input to a non-inverting input terminal of the operational amplifier; and a fifth selection switch for switching the temperature-dependent potential of the operational amplifier between an inverting output from the inverting terminal and a non-inverting output from the non-inverting terminal, wherein the control circuit switches the third selection switch, the fourth selection switch, and the fifth selection switch in synchronization with a timing of switching the first selection switch and the second selection switch.

4. A temperature sensor according to claim 2, further comprising:

a third selection switch for selecting one of the first base-emitter voltage and the second base-emitter voltage to be input to an inverting input terminal of the operational amplifier;

a fourth selection switch for selecting another one of the first base-emitter voltage and the second base-emitter voltage to be input to a non-inverting input terminal of the operational amplifier; and a fifth selection switch for switching the temperature-dependent potential of the operational amplifier between an inverting output from the inverting terminal of the operational amplifier and a non-inverting output from the non-inverting terminal of the operational amplifier, wherein the control circuit is further configured to:

divide the first charge period into a first sub charge period and a second sub charge period;

switch the third selection switch, the fourth selection switch, and the fifth selection switch when a first pulse is output during the first sub charge period and a second pulse is output during the second sub charge period; and output the temperature-dependent pulse having the time width of adding the first sub charge period and the second sub charge period, wherein the temperature-dependent pulse is divided in frequency, thereby generating the first charge period corresponding to the addition of the first sub charge period and the second sub charge period.

5. A temperature sensor according to claim 1, wherein the capacitor comprises:

a first capacitor; and a second capacitor, the first capacitor and the second capacitor being switched for use during the first charge period and during the second charge period.

6. A temperature sensor according to claim 1, wherein the resistor is made of a material having such a temperature characteristic that a resistance of the resistor decreases as temperature increases.

* * * * *